United States Patent [19]

Yatsuka et al.

[11] 4,241,348

[45] Dec. 23, 1980

[54] RADAR EQUIPMENT FOR VEHICLES

[75] Inventors: Hiroyuki Yatsuka, Kawasaki; Yasuhiro Isogai, Akashi, both of Japan

[73] Assignees: Fujitsu Limited; Fujitsu Ten Limited, both of Japan

[21] Appl. No.: 68,005

[22] Filed: Aug. 20, 1979

[30] Foreign Application Priority Data

Aug. 21, 1978 [JP] Japan .............................. 53-101563

[51] Int. Cl.³ ...................... G01S 13/26; G01S 13/34; H01Q 13/10
[52] U.S. Cl. .............................. 343/17.5; 343/100 PE; 343/771
[58] Field of Search .............. 343/767, 768, 771, 735, 343/17.5, 100 PE, 11 VB

[56] References Cited

U.S. PATENT DOCUMENTS 3,491,363  1/1970  Young, Jr. .......................... 343/771

Primary Examiner—Stephen C. Buczinski
Attorney, Agent, or Firm—Staas and Halsey

[57] ABSTRACT

Radar equipment for vehicles which sends out from a transmitting antenna a continuous wave signal modulated by a frequency modulator, receives a reflected wave by a receiving antenna and mixes it with one portion of the output from the frequency modulator by a mixer for output and in which the transmitting antenna and the receiving antenna are arranged in a V-letter form. A directional coupler is provided between the frequency modulator and the transmitting antenna for applying one portion of the output from the frequency modulator to a mixer of an in-line type and a coupling element are disposed between the receiving antenna and the directional coupler, and an impedance-adjustable dummy load is connected to a dummy terminal of the directional coupler.

3 Claims, 5 Drawing Figures

RADAR EQUIPMENT FOR VEHICLES

BACKGROUND OF THE INVENTION

1. Field of the Invention

This invention relates to a radar equipment for vehicles in which a transmitting and a receiving antenna are arranged in a V-letter form.

2. Description of the Prior Art

A variety of radar equipments have been proposed for measurement of the distance between vehicles, detection of an obstacle standing ahead of them, and like purposes. A radar equipment of the type employing a V-shaped antenna, such as shown in FIG. 1, exhibits an advantage that it hardly suffers from radio wave interference by a vehicle running in the opposite direction. This V-shaped antenna comprises an edge shunt slots array antenna 1 and a longitudinal shunt slots array antenna 2 arranged in a V-letter form, a transmitter-receiver unit 3 provided at the link between the antennas 1 and 2, and semicylindrical parabolic reflectors 4 and 5 respectively mounted on the antennas 1 and 2. The plane of polarization of each antenna is inclined at an angle of 45° relative to a perpendicular direction, and the resultant beam is a sharp pencil beam.

By using one of the antennas for transmitting use and the other for receiving use, their planes of polarization are displaced 90° apart in relation to a vehicle running in the opposite direction, so that the V-shaped antenna is subjected to substantially no radio wave interference.

In the case of employing an FM-CW (Frequency Modulation Continuous Wave) radar, the arrangement shown in FIG. 2 may be adopted. In FIG. 2, reference character SA indicates a sending antenna; RA designates a receiving antenna; DCa and DCb identify directional couplers; Ra and Rb denote dummy loads; FMOSC represents a frequency modulator; MODOSC shows a modulation generator; MIX refers to a mixer; and AMP indicates an amplifier. The sending antenna SA and the receiving antenna RA constitute the V-shaped antenna shown in FIG. 1. By the directional coupler DCa provided between the frequency modulator FMOSC and the sending antenna SA, the output from the frequency modulator FMOSC is branched to the directional coupler DCb provided between the mixer MIX and the receiving antenna RA, and mixed with a received signal in the mixer MIX. The mixer output is amplified by the amplifier AMP to derive therefrom a beat output, and a frequency-modulated continuous wave is sent out from the sending antenna SA, and a reflected wave from an obstacle or the like is received by the receiving antenna RA, thereby to measure, with the output signal from the amplifier AMP, the distance to the obstacle or the speed relative to the vehicle loaded with the radar equipment.

The aperture planes of waveguides of the sending and receiving antennas SA and RA at the feeding point perpendicular intersect each other in the longitudinal direction of each waveguide; accordingly, it is necessary to employ a twist waveguide for coupling the both antennas so that they extend in parallel in their lengthwise direction. But, since the twist waveguide is relatively bulky, the transmitter-receiver unit disposed at the base of the V-shaped antenna cannot be reduced in size.

SUMMARY OF THE INVENTION

This invention is to provide a radar equipment for vehicles which suppresses generation of FM-AM conversion noises and permits miniaturization of the transmitter-receiver unit of the V-shaped antenna and hence is advantageous from the economical point of view.

The above objective can be achieved by providing a radar equipment for vehicles which has a sending and a receiving antenna arranged in a V-letter form, sends out an FM continuous wave from the sending antenna, receives a reflected wave with the receiving antenna and mixes the received signal with one portion of the FM continuous wave signal, and in which a directional coupler is provided between a frequency modulator and the sending antenna for applying one portion of the output from the frequency modulator to a mixer, a coupling element is provided so that a waveguide of an in-line type mixer supplied with the received signal from the receiving antenna and a waveguide of the directional coupler perpendicularly intersect each other in their lengthwise direction to achieve predetermined coupling between the waveguide, and an impedance-adjustable dummy load is connected to a dummy terminal of the directional coupler.

DESCRIPTION OF THE PREFERRED EMBODIMENTS

Figure 1:
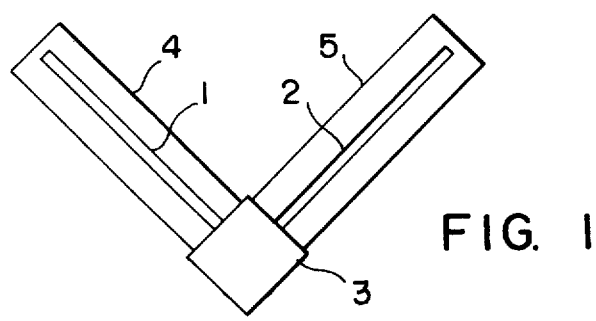
FIG. 1 is explanatory of a V-shaped antenna.
Figure 2:
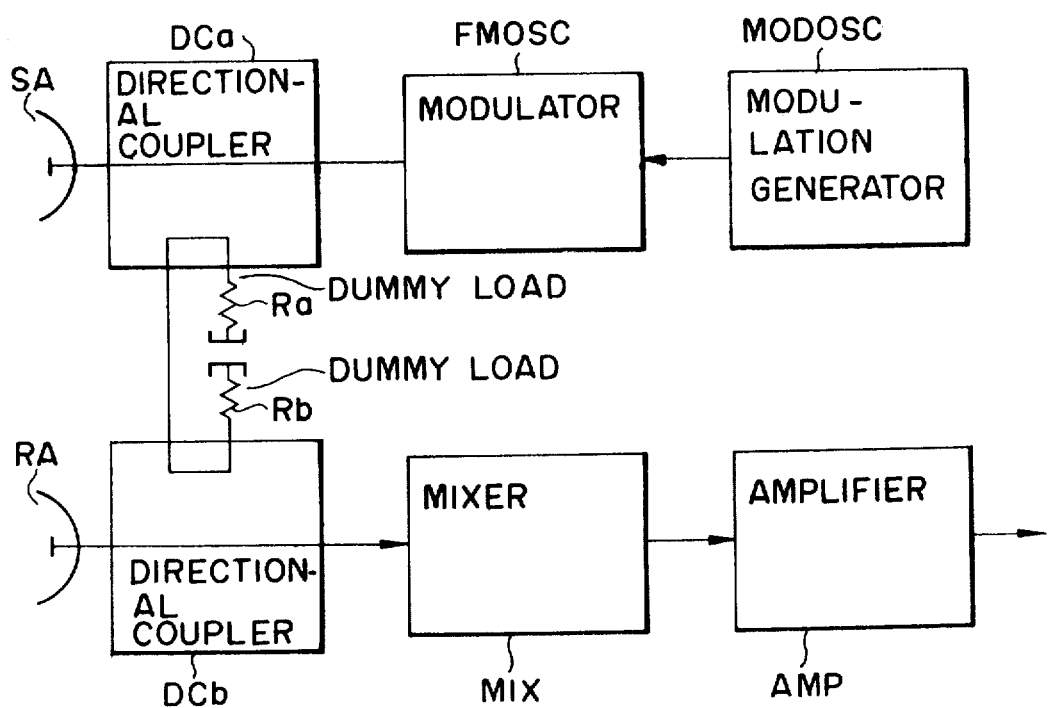
FIG. 2 is a block diagram showing an example of an FM-CW radar equipment heretofore employed.
Figure 3:
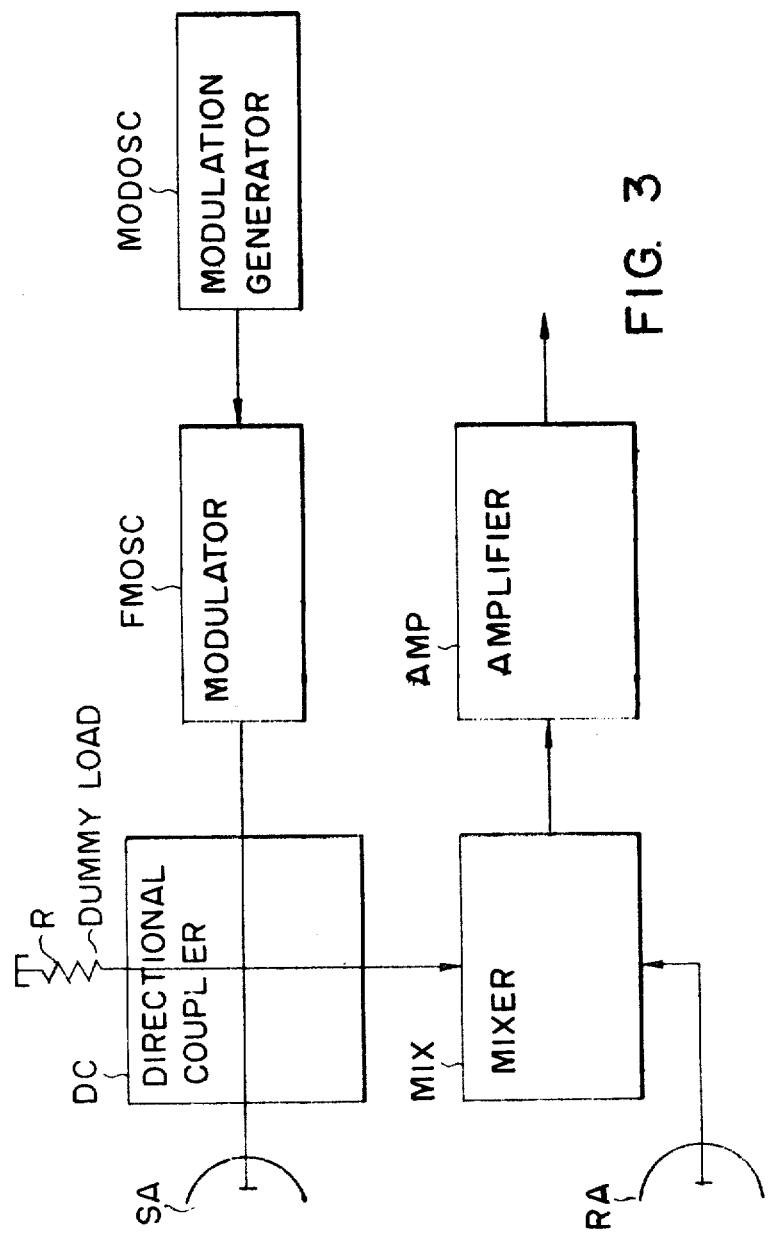
FIG. 3 is a block diagram illustrating an embodiment of this invention.

FIG. 3 illustrates in block form an embodiment of this invention. In FIG. 3, parts corresponding to those in FIG. 2 are identified by the same reference numerals. Reference character DC indicates a cross-shaped directional coupler, and R designates a dummy load. One portion of the output from the frequency modulator FMOSC is branched by the cross-shaped directional coupler DC and supplier to the mixer MIX via a coupling element described later.

Figure 4:
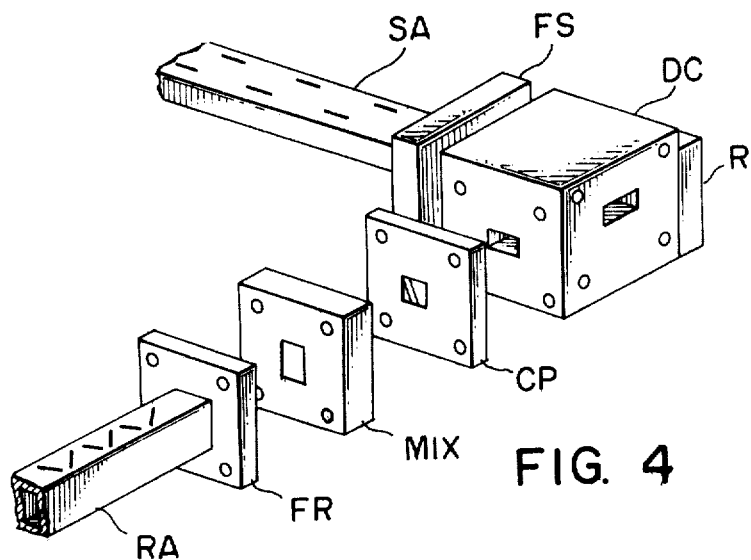
FIG. 4 is an exploded perspective view showing the principal part of the embodiment of this invention.

FIG. 4 is an exploded perspective view showing the principal part of the embodiment of this invention, in which the sending antenna SA is a longitudinal shunt slots array antenna and the receiving antenna RA is an edge shunt slot array antenna. Reference characters FS and FR indicate flanges; MIX designates an in-line type mixer; CP identifies a coupling element; DC denotes a cross-shaped directional coupler; and R represents a dummy load. The coupling element CP has a very thin structure that achieves suitable coupling, by means of a slit or the like, between waveguides which perpendicularly intersect each other in their longitudinal direction, and this coupling element CP is disposed between the directional coupler DC and the mixer MIX.

Generally, in the case of an FM-CW radar, if its transmission characteristic in the section from the frequency modulator to the mixer has an amplitude-frequency characteristic, a modulated wave and the distorted component appear at the output end of the mixer, and are superimposed on the signal component, resulting in lowered radar sensitivity. Accordingly, it is desired that the amplitude-frequency characteristic be flat (a deviation of less than 0.1 dB in practical use). In practice, however, there is dispersion in the characteristics of an oscillator, a directional coupler, etc., the amplitude-frequency characteristic may have some gradient in many cases. Such gradient can be compensated by a circuit having the opposite characteristic, but this leads to bulkiness of the radar equipment and hence is difficult to adopt in practical use.

In the present invention, the sending antenna SA is coupled to one terminal of the directional coupler DC, and the receiving antenna RA is coupled via the coupling element CP and the mixer MIX to a terminal perpendicularly intersecting the abovesaid terminal to thereby reduce the size of the transmitter-receiver unit disposed at the base of the V-shaped antenna, and the amplitude-frequency characteristic is made flat by adjusting the dummy load R to thereby suppress the FM-AM conversion noises.

Figure 5:
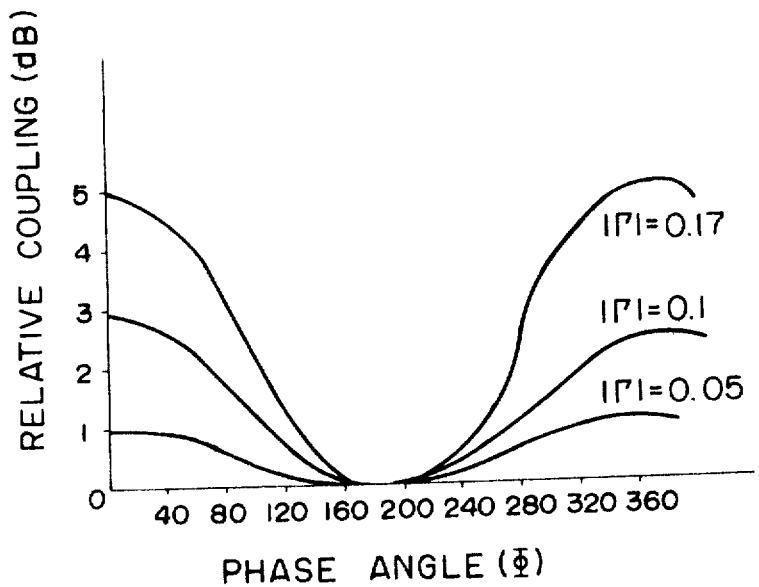
FIG. 5 is a graph showing the relationships between a phase angle of a load impedance and the relative coupling of frequency modulator output with a mixer, using the reflection factor of a load as a parameter.

FIG. 5 illustrates the results of measurement of variations in the amount of coupling of one portion of the output from the frequency modulator FMOSC to the mixer MIX with respect to the impedance of the dummy load R. FIG. 5 shows the relative coupling (dB) to the phase angle ($\Phi$) of the load impedance, using its reflection factor [$\Gamma$] as a parameter. It appears from FIG. 5 that a deviation $\Delta P$ in the amplitude-frequency characteristic of the frequency modulator FMOSC and the directional coupler DC can be reduced by suitably selecting the reflection factor and the phase angle of the load impedance.

For example, in the case where the amplitude-frequency characteristic of a high-frequency element, such as the FM modulator FMOSC and the mixer MIX, is a primary inclination characteristic, it is sufficient to select the phase angle $\Phi$ to be about 90° to 280° and the reflection factor [$\Gamma$] in accordance with the deviation $\Delta P$ so that an inclination in the opposite direction is provided. When the amplitude-frequency characteristic is flat, the reflection factor [$\Gamma$] is selected to be zero or close thereto, and if a secondary distortion is negligible, the phase angle $\Phi$ is selected to be about, 180°, 0° or 360°. Where the amplitude-frequency characteristic is a secondary one, the phase angle $\Phi$ is selected to be 0° or 90° to obtain a characteristic opposite to the amplitude-frequency characteristic, and the curvature is corrected by a suitable selection of the reflection factor [$\Gamma$].

Thus, the amplitude-frequency characteristic can be made flat by adjusting the impedance of the dummy terminal of the directional coupler DC, as described above, and this adjustment can also be achieved by connecting a variable attenuator and a phase shifter to the dummy terminal.

As has been described in the foregoing, the present invention employs the coupling element CP instead of the twist waveguide, for coupling the waveguides of the directional coupler DC and the in-line type mixer MIX which perpendicularly intersect each other in their lengthwise direction; furthermore, the coupling element CP is very thin, and the mixer MIX is in-line type, so that the transmitter-receiver unit at the base of the V-shaped antenna can be made small. Moreover, the amplitude-frequency characteristic can easily be made flat by adjusting the impedance of the dummy load, and consequently a severe limitation imposed on the frequency modulator FMOSC (for example, the deviation $\Delta P \leq 0.1$ dB) can be alleviated, resulting in a decrease in the manufacturing cost.

It will be apparent that many modifications and variations may be effected without departing from the scope of the novel concepts of this invention.

What is claimed is:

1. Radar equipment for vehicles which sends out from a transmitting antenna a continuous wave signal modulated by a frequency modulator, receives a reflected wave by a receiving antenna and mixes it with one portion of the output from the frequency modulator and in which the sending and the receiving antenna are arranged in a V-letter form, characterized by a directional coupler provided between the frequency modulator and the sending antenna for applying one portion of the output from the frequency modulator to a mixer of an in-line type supplied with the received signal from the receiving antenna, a coupling element provided so that a waveguide of the in-line type mixer and a waveguide of the directional coupler perpendicularly intersect each other in their lengthwise direction to achieve predetermined coupling between the waveguides, and an impedance-adjustable dummy load connected to a dummy terminal of the directional coupler.

2. A radar equipment for vehicles according to claim 1, wherein the sending and the receiving antenna are an edge shunt slots array antenna and a longitudinal shunt slots array antenna respectively.

3. A radar equipment for vehicles according to claim 1, wherein the sending antenna is attached to one surface of a cross-shaped directional coupler, wherein the receiving antenna is attached to the other surface of the cross-shaped directional coupler via the in-line type mixer and the coupling element, and wherein the sending and the receiving antenna are arranged in a V-letter form.

* * * * *